(12) United States Patent
Cross

(10) Patent No.: US 11,801,666 B2
(45) Date of Patent: Oct. 31, 2023

(54) STRUCTURE FORMED FROM COMPOSITE MATERIAL

(71) Applicant: AIRBUS OPERATIONS LIMITED, Bristol (GB)

(72) Inventor: Matthew Cross, Bristol (GB)

(73) Assignee: Airbus Operations Limited, Bristol (GB)

( * ) Notice: Subject to any disclaimer, the term of this patent is extended or adjusted under 35 U.S.C. 154(b) by 352 days.

(21) Appl. No.: 15/382,186

(22) Filed: Dec. 16, 2016

(65) Prior Publication Data
US 2017/0173919 A1 Jun. 22, 2017

(30) Foreign Application Priority Data

Dec. 18, 2015 (GB) .................................... 1522407

(51) Int. Cl.
*B32B 15/14* (2006.01)
*B32B 5/26* (2006.01)
(Continued)

(52) U.S. Cl.
CPC .............. *B32B 15/14* (2013.01); *B32B 3/266* (2013.01); *B32B 5/02* (2013.01); *B32B 5/26* (2013.01); *B32B 7/12* (2013.01); *B32B 15/02* (2013.01); *B32B 15/04* (2013.01); *B32B 15/043* (2013.01); *B32B 15/20* (2013.01); *B32B 37/14* (2013.01); *B64D 45/02* (2013.01); *B32B 2255/00* (2013.01); *B32B 2255/06* (2013.01); *B32B 2255/205* (2013.01); *B32B 2260/023* (2013.01); *B32B 2260/046* (2013.01); *B32B 2262/106* (2013.01); *B32B 2307/202* (2013.01); *B32B 2307/732* (2013.01); *B32B 2605/00* (2013.01); *B32B 2605/18* (2013.01); *B33Y 10/00* (2014.12)

(58) Field of Classification Search
CPC ..... B32B 15/08; B32B 15/14; B32B 2605/18; B32B 15/02; B32B 3/18; B32B 3/14; B32B 3/10; B32B 5/26; B32B 2260/023; B32B 2255/06; B32B 2255/205; B32B 3/16; B32B 3/266; B32B 5/12
See application file for complete search history.

(56) References Cited

U.S. PATENT DOCUMENTS 2,764,808 A * 10/1956 Coffman ................. B32B 15/08
228/122.1
3,515,615 A * 6/1970 Hasegawa ............... B29C 59/16
156/273.3
(Continued)

FOREIGN PATENT DOCUMENTS

GB 805546 A * 12/1958 ............. B29C 70/00
JP 09121094 A * 5/1997
(Continued)

OTHER PUBLICATIONS

Roebroeks, Fibre Metal Laminates, an introduction, 2001, edited by Vlot and Gunnink, pp. 23-24. (Year: 2001).*
(Continued)

*Primary Examiner* — Monique R Jackson
(74) *Attorney, Agent, or Firm* — KDW Firm PLLC

(57) ABSTRACT

A structure formed from composite material and method of forming a composite structure is disclosed in which one or more metal layers are disposed on a composite structural member.

19 Claims, 4 Drawing Sheets

(51) Int. Cl.
*B32B 3/26* (2006.01)
*B32B 15/02* (2006.01)
*B32B 15/20* (2006.01)
*B64D 45/02* (2006.01)
*B32B 5/02* (2006.01)
*B32B 7/12* (2006.01)
*B32B 15/04* (2006.01)
*B32B 37/14* (2006.01)
*B33Y 10/00* (2015.01)

(56) References Cited

U.S. PATENT DOCUMENTS

| | | | | |
|---|---|---|---|---|
| 3,755,713 | A * | 8/1973 | Paszkowski | B29C 70/885 |
| | | | | 361/218 |
| 3,989,984 | A * | 11/1976 | Amason | B29C 70/885 |
| | | | | 361/212 |
| 4,746,389 | A * | 5/1988 | DiGenova | B29C 70/028 |
| | | | | 156/247 |
| 4,888,451 | A * | 12/1989 | Toni | B64D 45/02 |
| | | | | 174/94 R |
| 5,370,921 | A * | 12/1994 | Cedarleaf | B32B 15/14 |
| | | | | 428/138 |
| 5,866,272 | A * | 2/1999 | Westre | B32B 3/12 |
| | | | | 428/593 |
| 6,736,919 | B1 | 5/2004 | Roebroeks | |
| 2006/0051592 | A1* | 3/2006 | Rawlings | B32B 15/08 |
| | | | | 428/423.1 |
| 2006/0108059 | A1* | 5/2006 | Modin | B29C 70/48 |
| | | | | 156/252 |
| 2007/0042214 | A1* | 2/2007 | Rajabali | B32B 15/08 |
| | | | | 428/624 |
| 2008/0006741 | A1* | 1/2008 | Martin | B64C 1/12 |
| | | | | 244/119 |
| 2010/0086804 | A1 | 4/2010 | Popp et al. | |
| 2010/0133380 | A1* | 6/2010 | Roebroeks | B64C 1/12 |
| | | | | 244/119 |
| 2010/0304063 | A1* | 12/2010 | McCrea | B32B 15/16 |
| | | | | 428/35.8 |
| 2013/0015292 | A1* | 1/2013 | Zielinski | B32B 3/10 |
| | | | | 244/1 A |
| 2015/0090836 | A1* | 4/2015 | Burgess | B64D 45/02 |
| | | | | 244/1 A |
| 2015/0336684 | A1* | 11/2015 | Fideu Siagam | B29C 70/46 |
| | | | | 361/220 |
| 2017/0080671 | A1* | 3/2017 | Gunnink | B32B 15/09 |
| 2018/0346146 | A1* | 12/2018 | Sang | B32B 3/266 |

FOREIGN PATENT DOCUMENTS

| | | | | |
|---|---|---|---|---|
| WO | 9853989 | A1 | 12/1998 | |
| WO | 2008132050 | A1 | 11/2008 | |
| WO | WO-2015142170 | A1 * | 9/2015 | B32B 3/08 |

OTHER PUBLICATIONS

Machine translation of JP09-121094A, published May 1997. (Year: 1997).*

Plating, Wikipedia (RTM)—The Free Encyclopedia, downloaded from "https://en.wikipedia.org/wiki/Plating#Zinc-Nickel_plating" on Sep. 21, 2017. (Year: 2017).*

UKIPO Search Report dated Jun. 29, 2016 issued in Great Britain Application No. 1522407.4.

* cited by examiner

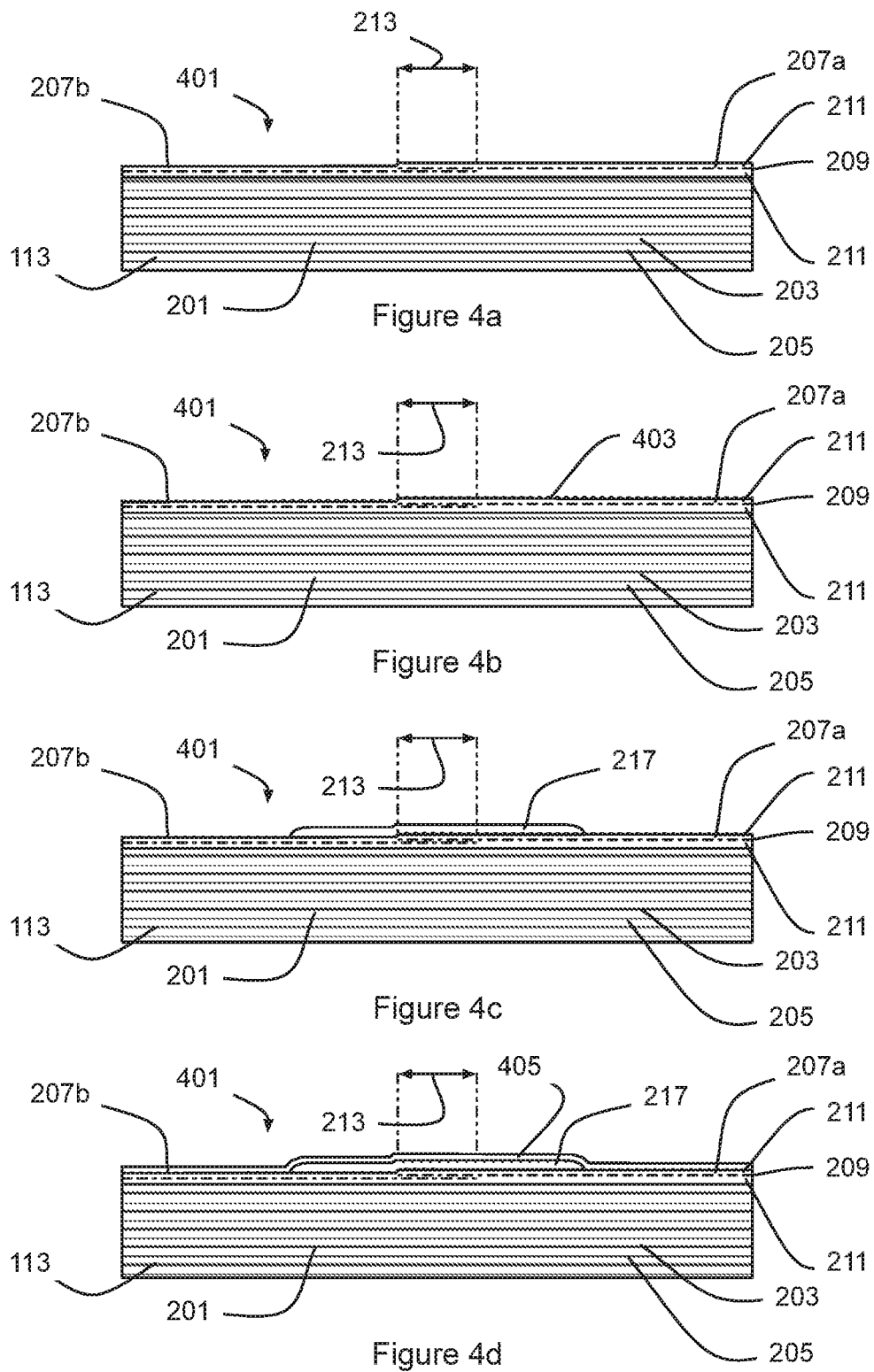

STRUCTURE FORMED FROM COMPOSITE MATERIAL

RELATED APPLICATIONS

The present application claims priority from Great Britain Application No. 1522407.4, filed Dec. 18, 2015, the disclosure of which is hereby incorporated by reference herein in its entirety.

FIELD OF TECHNOLOGY

The present technology relates to structures formed from composite material. The technology further relates to a composite material comprising an electrically conductive outer layer for dissipating electric charge and a method of manufacturing such a composite material.

BACKGROUND

Synthetic composite materials such as carbon fibre reinforced plastic (CFRP) commonly comprise a set of one or more layers or plies of carbon fibre cloth or matrix laminated together with a resin to form a desired structure. The carbon fibre plies may be impregnated with resin prior to being laid-up to form the required structure or the resin may be applied to plain carbon fibre plies during the lay-up process. Resins are commonly thermosetting with the laid-up structure being heated, for example, in an autoclave, to cure the structure. The cured structure may then be keyed for painting, for example, by grit blasting the surface to be painted, prior to paint being applied.

BRIEF SUMMARY OF THE TECHNOLOGY

Embodiment of the present technology provide a structure comprising: a composite structural member comprising: a first set of layers comprising a synthetic composite material; and a plurality of adjoined metallic second layers disposed on the first layer, and a metallic third layer disposed on the composite structural member at least partially overlaying at least part of the joint between two of the metallic second layers. The first and second layers may be integrally formed. At least one of the second layers may be substantially covered by a matrix material. One or more of the second layers may comprise a foraminous metal layer. One or more of the second layers may comprise metallic mesh, gauze or expanded foil. One or more of the second layers may comprise copper or bronze. The second layers may be joined by a lap joint. The second layers may be joined by a butt joint.

The third layer may comprise a metal film. The third layer may comprise a thermally applied metal film. The third layer may comprise aluminium or copper or silver or zinc or nickel. The metal of the third layer may be selected so as to be galvanically compatible with the metal of the second layer. The third layer may comprise a metal film less than 15 µm thick. The third layer may comprise a metal film less than 25 µm thick. The third layer may comprise a metal film less than 50 µm thick.

Another embodiment of the present technology provides a method for forming a structure comprising the steps of: forming a composite structural member comprising: a first layer comprising a synthetic composite material; and a plurality of adjoined metallic second layers disposed on the first layer, and disposing a metallic third layer on a first surface of the composite structural member at least partially overlaying at least part of the joint between two second layers.

The method may comprise the further step of: applying a keying treatment to the first surface of the composite structural member prior to disposing the third layer. The method may comprise the further step of: applying a paint coat to the first surface of the composite structural member and the third layer.

A further embodiment of the present technology provides a structure substantially as disclosed herein with respect to FIG. 2. Another embodiment of the present technology provides a structure substantially as disclosed herein with respect to FIG. 3. A further embodiment of the present technology provides a method of manufacturing a structure substantially as disclosed herein with respect to FIGS. 4a & 4c.

BRIEF DESCRIPTION OF THE DRAWINGS

Embodiments of the technology will now be described, by way of example only, with reference to the following drawings in which:

FIGS. 4a, 4b, 4c & 4d are successive cross sectional views illustrating manufacturing steps for the structural element of FIG. 2.

DETAILED DESCRIPTION OF EMBODIMENTS OF THE TECHNOLOGY

Figure 1:
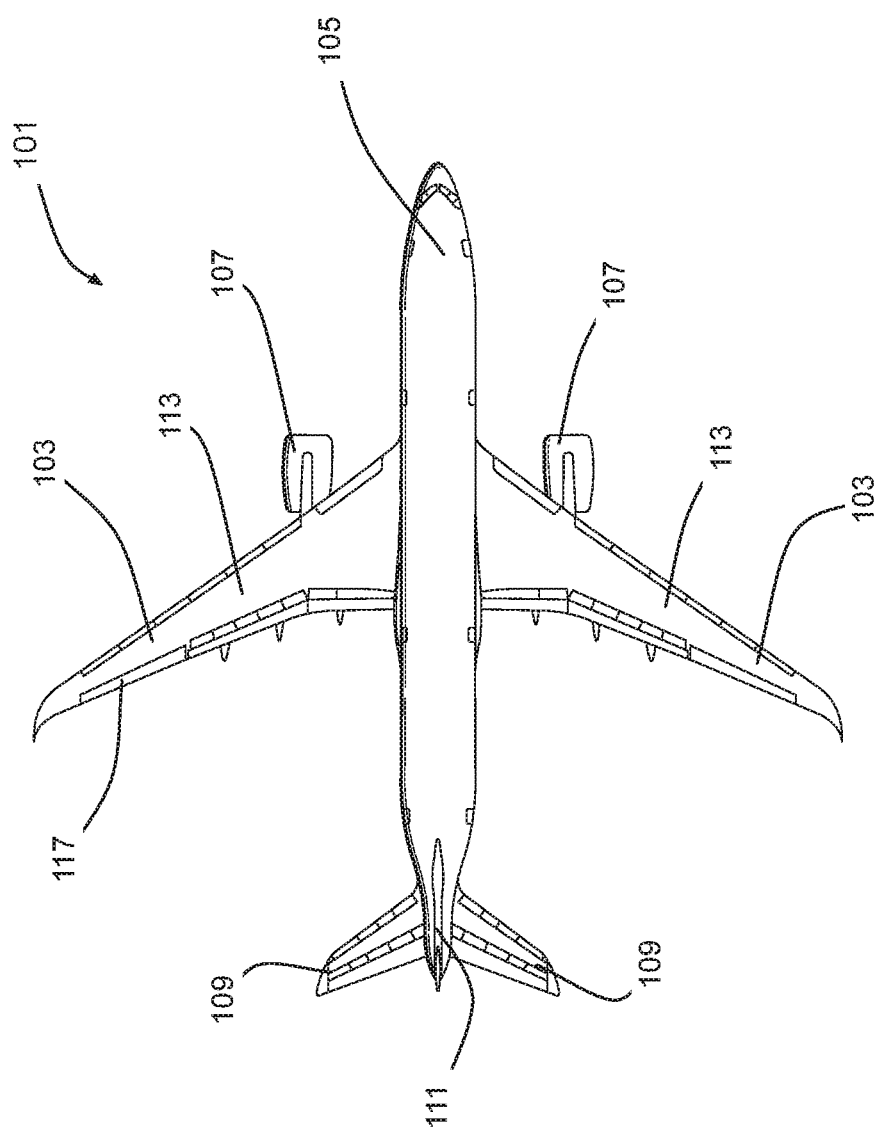
FIG. 1 is a perspective side view of an aircraft partially formed from synthetic composite material in the form of CFRP.

With reference to FIG. 1, an aircraft 101 comprises a pair of wings 103 faired into a fuselage 105. The wings 103 each carry an engine 107. The aircraft further comprises horizontal stabilizers 109 and a vertical tail plane 111 each attached at the rear of the fuselage 105. The aircraft 101 comprises structural elements that are formed from carbon fibre reinforced plastic material (CFRP). For example, the wings 103 comprise exterior structural members in the form of wing covers 113 formed from CFRP.

Figure 2:
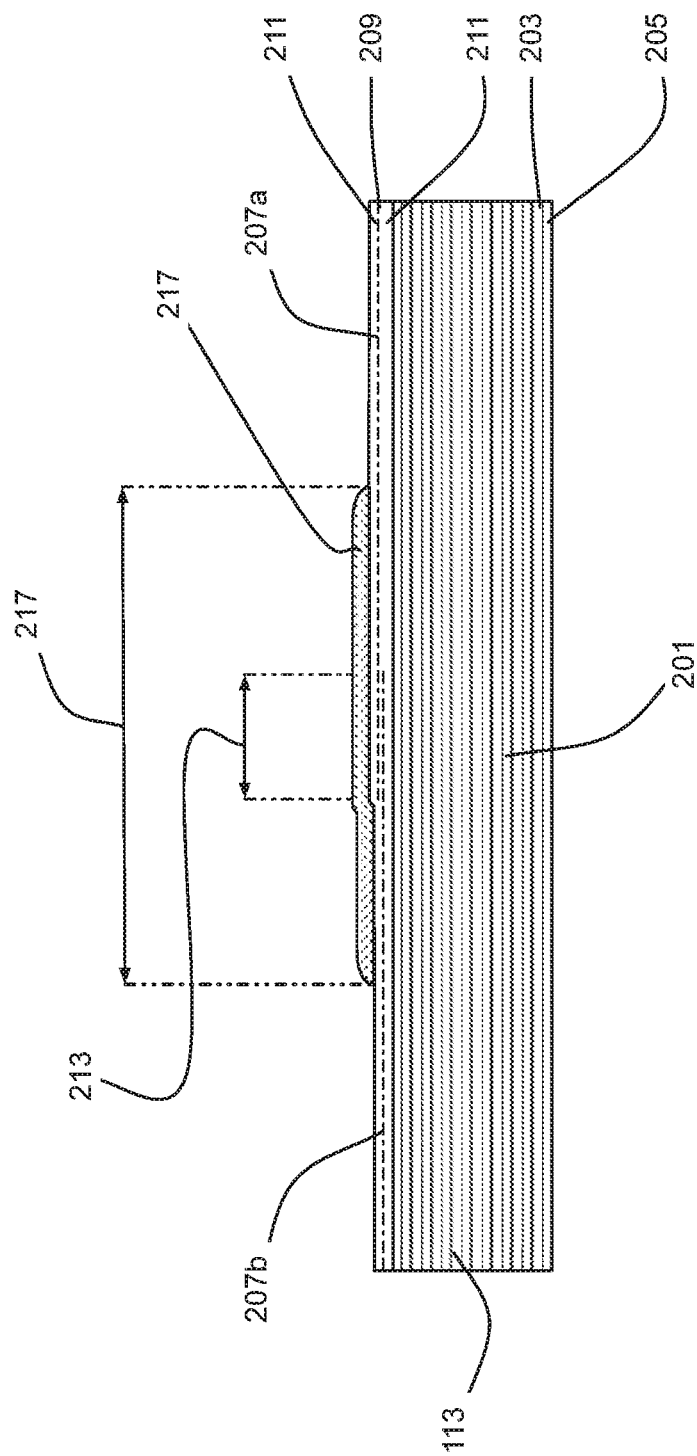
FIG. 2 is a cross sectional view of a CFRP structural element of the aircraft of FIG. 1, in accordance with an embodiment of the present technology.

With reference to the cross sectional view of FIG. 2, each of the wing covers 113 comprises a composite structural member 201 made up of layers of carbon fibre layers 203 bound in matrix layers 205 of a thermoset polymer. The upper surface of the wing cover 113 in FIG. 2, which, in use, comprises the exterior surface of the wing 103, comprises a plurality of metallic layers 207a, 207b. Each of the metallic layers 207a, 207b comprises a metal layer 209 substantially covered or encapsulated in the matrix 211. In the present embodiment, the metallic layers 207a, 207b are adjoined by a lap joint 213 having a predetermined width. The metallic layers 207a. 207b are co-formed as part of the composite structural member 201. In other words, the composite structural member 201 comprises an upper or outer electrically conductive layer provided by the metallic layers 207a, 207b.

The metallic layers 207a, 207b are arranged to provide a conductive layer in the surface of the structural member 201 for dissipating electrical charge resulting from static electricity or lightning strike. The metal layer 209 of the metallic layers 207a, 207b in the present embodiment is provided by expanded copper foil (ECF) or bronze gauze (BG). The structure of ECF or BG provides a continuous metallic layer that also defines holes, in other words, the metal layer 209 is foraminous. The foraminous nature of the metal layer 209 means the metallic layers 207a, 207b are more flexible, thus aiding their laying up into the composite structure 201 and also improves the combined structural integrity of the matrix 211 and metal layer 209.

The wing skin 113 comprises a further metallic layer 217 disposed on the exterior surface of the wing skin 113 and extending over the lap joint 213. In the present embodiment, the metallic layer 217 at least partially overlaps at least part of the lap joint 213 and is formed of a metallic film. In the present embodiment, the metallic layer 217 comprises a 15 μm thick layer of aluminum and is applied by a thermal spray deposition method. Aluminum is highly electrically conductive and also galvanically compatible with the ECF or BG of the other metallic layers 207a, 207b.

The overlap in the joint 213 provides electrical connectivity between the second metallic layers 207a, 207b. In some areas of the joint 213 the respective metal layers 209 may be in direct physical and electrical contact and in other areas the metal layers 209 may be at least partially separated by matrix material 211. In response to electrical charge in one of the metal layers 209 at the joint 213 exceeding a threshold, interposed matrix material 211 electrically breaks down and thus provides a path for conduction of the charge between the metal layers 209. As will be understood by those skilled in the art, such electrical breakdown of the interposed matrix material 211 is likely to be significantly energetic. The metallic layer 217 is arranged to contain such energetic events away from the external surface of the wing skin 113 by providing further paths for dissipation of the electrical charge into the regions of the metallic layers 207a, 207b surrounding the joint 213.

Further embodiments of the technology are described below with reference to respective figures in which, for clarity, the same nomenclature is used between figures for elements are common between embodiments.

Figure 3:
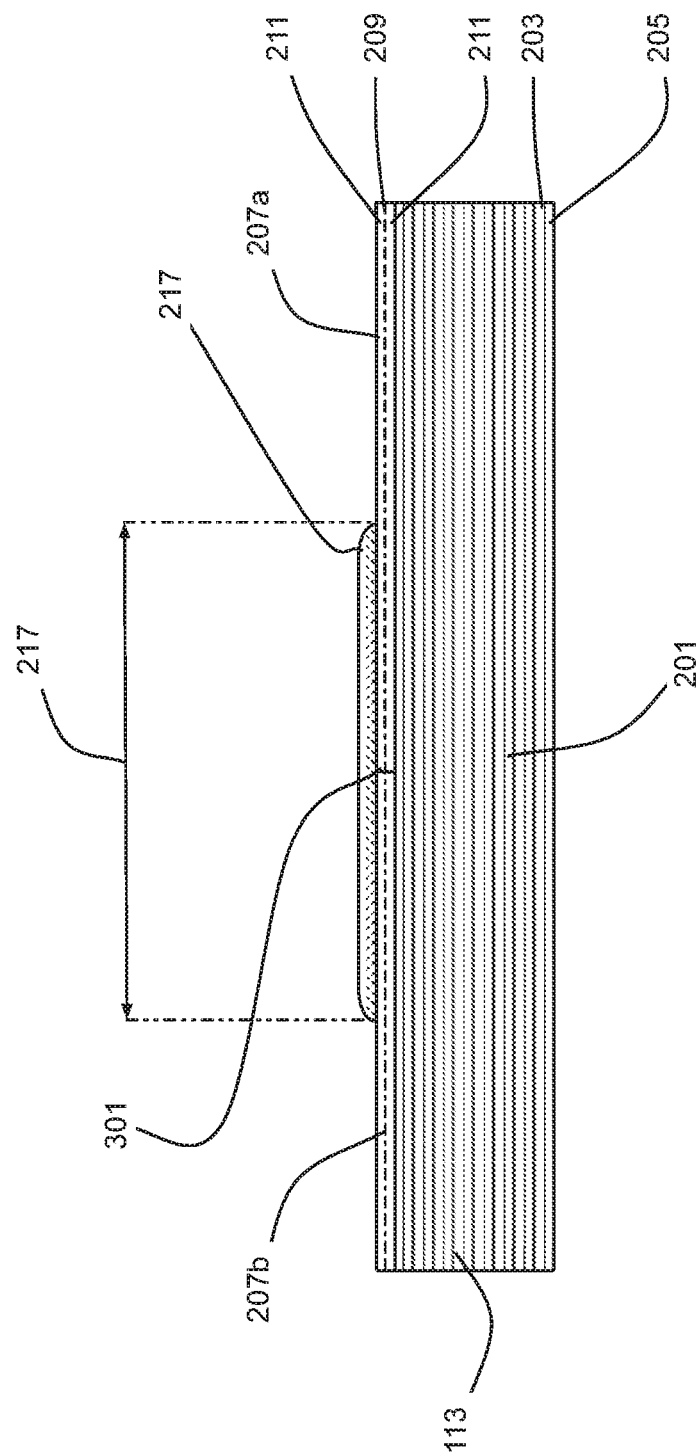
FIG. 3 is a cross sectional view of a CFRP structural element of the aircraft of FIG. 1, in accordance with another embodiment of the present technology.

In another embodiment of the technology, with reference to FIG. 3, the second metallic layers 207a, 207b are joined by a butt joint 301 substantially free of overlap.

A method for manufacturing the composite structure of FIG. 2 will now be described with reference to FIGS. 4a to 4d. In FIG. 4a, the wing skin 113 is formed using known composite material forming techniques to lay up layers of carbon fibre 203 pre-impregnated with matrix material 205 in the form of thermosetting polymer resin. The wing skin 113 is then heated in an autoclave to cure CFRP material. With reference to FIG. 4b, a keying process is applied to the exterior surface 401 of the wing skin 113 to provide a surface key 403 to aid adhesion of subsequent layers. In the present embodiment, the keying process is grit blasting. With reference to FIG. 4c, the metallic layer 217 is applied to the upper surface 401 over the joint 213. In the present embodiment the metallic layer 217 comprises aluminum up to 15 μm thick and applied by a thermal spray deposition method. With reference to FIG. 4d, a paint system 405 is applied to the exterior surface 401 of the wing skin 113 and the exposed surface of the metallic layer 217.

In another embodiment of the technology, the metallic layer 217 is up to 25 μm thick. In a further embodiment of the technology, the metallic layer 217 is up to 50 μm thick. As will be understood by those skilled in the art, the metallic layer 217 may be formed from any other suitable metal such as copper or silver or zinc or nickel or any relevant alloy thereof. The metallic layer 217 may be disposed on the structural member by any suitable means or method not limited to thermal spraying methods, for example, cold metal spray, plasma or vapour deposition or printing. The gauze or expanded foil of the metallic layers 207 may be substituted for any other suitable structure or combination of structures such as gauze.

In another embodiment, the joint between the metallic layers 207 is part lap joint and part butt joint.

As will be understood by those skilled in the art, the keying technique is not limited to grit blasting as described above but keying may be achieved by any other suitable method of roughening or ablating a surface. Examples of possible suitable techniques include the application of a mechanical tool or material, chemical etching, the inclusion of a sacrificial peel ply in the surface of the composite material or laser ablation.

As will be understood by those skilled in the art, the technology described herein is not limited in application to any particular aircraft structure and may be applied to any structure of an aircraft. As will be understood by those skilled in the art, the technology described herein may be applied to any type of structure, including automotive, space, maritime or civil engineering structures where a conductive exterior layer is affixed to a composite structural element. The technology may be applied to a selected part or substantially the whole of any such structure.

As will be understood by those skilled in the art, the whole or a selected part or layer of the structure in accordance with the technology described herein may be provided using additive layer manufacturing (ALM) techniques or three-dimension printing (3DP) techniques. For example, either of the metallic layers may be applied to a composite part by ALM or 3DP.

While the present technology has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the technology in its broader aspects is not limited to the specific details of the representative apparatus and method, and illustrative examples shown and described. Accordingly, departures may be made from such details without departure from the scope of applicant's general inventive concept.

The invention claimed is:

1. A structure comprising:
 a composite structural member comprising:
  a continuous first set of layers, each layer of the first set of layers comprising a synthetic composite material that has fibers and a polymeric matrix material, wherein layers of the first set of layers are adjacent to each other to form a stack of layers of the synthetic composite material; and
  a plurality of adjoined metallic second layers, each of which is disposed on a same external surface of the stack of layers of the synthetic composite material, wherein:
   the second layers form an exterior surface of the structure;
   the second layers extend parallel to each other in a first direction; and
   laterally adjacent second layers of the plurality of adjoined metallic second layers are arranged such that one of the laterally adjacent second layers overlaps another of the laterally adjacent second layers; and a metallic third layer, which comprises a metal material applied directly on an external surface of the second layers, on an opposite side from where the first set of layers is attached to the second layers, wherein the third layer overlays a joint between two of the second layers and extends in the first direction, parallel to the second layers that form the joint over which the third layer is overlaid, wherein each of the second layers comprises a metal material that is substantially covered and/or encapsulated by a matrix material, such that the metal material of each second layer is spaced apart from the metal material of an adjacent one of the second layers; and wherein a first layer of the first set of layers forms an interior surface of the structure and a last layer of the first set of layers is against the second layers, such that the first set of layers is continuous between the first layer and the last layer.

2. The structure according to claim 1, wherein the first set of layers and the second layers are integrally formed.

3. The structure according to claim 1, wherein one or more of the second layers comprises a foraminous metal layer.

4. The structure according to claim 1, wherein one or more of the second layers comprises metallic mesh, gauze or expanded foil.

5. The structure according to claim 1, wherein one or more of the second layers comprises copper or bronze.

6. The structure according to claim 1, wherein the third layer comprises a metal film.

7. The structure according to claim 1, wherein the third layer comprises a thermally applied metal film.

8. The structure according to claim 1, wherein the third layer comprises aluminum, copper, silver, zinc, or nickel.

9. The structure according to claim 1, wherein the metal material of the third layer is galvanically compatible with the metal material of the second layer.

10. The structure according to claim 1, wherein the third layer comprises a metal film less than 15 µm thick.

11. The structure according to claim 1, wherein the third layer comprises a metal film less than 25 µm thick.

12. The structure according to claim 1, wherein the third layer comprises a metal film less than 50 µm thick.

13. A structure comprising:
a composite structural member comprising:
  a continuous first set of layers, each layer of the first set of layers comprising a synthetic composite material that has fibers and a polymeric matrix material, wherein layers of the first set of layers are adjacent to each other to form a stack of layers of the synthetic composite material; and
  a plurality of adjoined metallic second layers, each of which is disposed on a same external surface of the stack of layers of the synthetic composite material, wherein:
    the second layers form an exterior surface of the structure;
    the second layers extend parallel to each other in a first direction; and
    laterally adjacent second layers of the plurality of adjoined metallic second layers are arranged such that one of the laterally adjacent second layers abuts against another of the laterally adjacent second layers; and a metallic third layer, which comprises a metal material applied directly on an external surface of the second layers, on an opposite side from where the first set of layers is attached to the second layers, wherein the third layer overlays a joint between two of the second layers and extends in the first direction, parallel to the second layers that form the joint over which the third layer is overlaid, wherein each of the second layers comprises a metal material that is substantially covered and/or encapsulated by a matrix material, such that the metal material of each second layer is spaced apart from the metal material of an adjacent one of the second layers; and wherein a first layer of the first set of layers forms an interior surface of the structure and a last layer of the first set of layers is against the second layers, such that the first set of layers is continuous between the first layer and the last layer.

14. The structure according to claim 13, wherein:
one or more of the second layers comprises a foraminous metal layer; and/or
one or more of the second layers comprises metallic mesh, gauze or expanded foil; and/or
one or more of the second layers comprises copper or bronze.

15. The structure according to claim 13, wherein:
the metal material of the third layer comprises a metal film; and/or
the metal material of the third layer comprises a thermally applied metal film; and/or
the metal material of the third layer comprises aluminum, copper, silver, zinc, or nickel; and/or
the metal material of the third layer is galvanically compatible with the metal material of the second layer.

16. A method for forming a structure comprising:
forming a composite structural member comprising:
  a continuous first set of layers, each layer of the first set of layers comprising a synthetic composite material that has fibers and a polymeric matrix material, wherein layers of the first set of layers are adjacent to each other to form a stack of layers of the synthetic composite material; and
  a plurality of adjoined metallic second layers, each of which is disposed on a same external surface of the stack of layers of the synthetic composite material;
  wherein the second layers form an exterior surface of the structure;
  wherein the second layers extend parallel to each other in a first direction; and
  wherein laterally adjacent second layers of the plurality of adjoined metallic second layers are arranged such that one of the laterally adjacent second layers overlaps or abuts against another of the laterally adjacent second layers; and disposing a metal material of a metallic third layer directly on an external surface of the second layers, on an opposite side from where the first set of layers is attached to the second layers, wherein the third layer overlays a joint between two of the second layers and extends in the first direction, parallel to the second layers that form the joint over which the third layer is disposed;

wherein each of the second layers comprises a metal material that is substantially covered and/or encapsulated by a matrix material, such that the metal material of each second layer is spaced apart from the metal material of an adjacent one of the second layers; and wherein a first layer of the first set of layers forms an interior surface of the structure and a last layer of the first set of layers is against the second layers, such that the first set of layers is continuous between the first layer and the last layer.

17. The method according to claim 16, comprising applying a keying treatment to the external surface of the second layers before the third layer is disposed on the external surface of the second layers.

18. The method according to claim 16, comprising applying a paint coat to the external surface of the second layers and the third layer.

19. The method according to claim 16, wherein the metallic third layer is applied directly on the composite structural member via thermal spray deposition, cold metal spray, or plasma or vapor deposition or printing.

* * * * *